United States Patent
Egawa et al.

(10) Patent No.: US 6,578,977 B2
(45) Date of Patent: Jun. 17, 2003

(54) SPREAD ILLUMINATING APPARATUS WITH IRREGULAR INTERVAL OF GROOVES OF LIGHT REFLECTION PATTERN

(75) Inventors: Motoji Egawa, Iwata-gun (JP); Shingo Suzuki, Iwata-gun (JP); Koichi Toyoda, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/983,608

(22) Filed: Oct. 25, 2001

(65) Prior Publication Data

US 2002/0051355 A1 May 2, 2002

(30) Foreign Application Priority Data

Oct. 26, 2000 (JP) .......................................... 2000-327089
Oct. 25, 2001 (JP) .......................................... 2001-327628

(51) Int. Cl.[7] ................................................. F21V 8/00
(52) U.S. Cl. .............................................................. 362/31
(58) Field of Search .................................... 362/31, 561

(56) References Cited

U.S. PATENT DOCUMENTS 5,786,665 A * 7/1998 Ohtsuki et al. ................ 362/31
5,980,054 A * 11/1999 Fukui et al. .................... 362/31
6,074,069 A * 6/2000 Chao-Ching et al. ......... 362/31
6,123,431 A * 9/2000 Teragaki et al. ............... 362/31
6,164,790 A * 12/2000 Lee ................................ 362/31
6,224,223 B1 * 5/2001 Higuchi et al. ................ 362/31

FOREIGN PATENT DOCUMENTS

| JP | A 11-260128 | 9/1999 |
|---|---|---|
| JP | A 11-339526 | 12/1999 |

* cited by examiner

Primary Examiner—Laura K. Tso
(74) Attorney, Agent, or Firm—Oliff & Berridge PLC (57) ABSTRACT

There is provided a spread illuminating apparatus to suppress the appearance of moiré fringes. A light reflection pattern of a transparent substrate is composed of grooves of substantially triangular in section and flat portions adjacent thereto. The light reflection pattern is formed substantially parallel to the optical axis of a bar-like light source and the depth of the grooves increases gradually in proportion to the increase in distance from the light source. The interval of the adjacent grooves (the groove interval) is set to vary irregularly. Thereby, the relation between the interval of grooves and the interval of mosaic pattern of liquid crystal cells is not definite, and the appearance of moiré pattern can be suppressed. The variation ratio of the groove interval is set to range 25% to 85% of the average groove interval

12 Claims, 6 Drawing Sheets

An Example of Random Setting

| Random Number 0 | Order i | Distance from P0 Pi (mm) | groove Interval Pi-Pi-1(mm) | Standard Distance (mm) |
|---|---|---|---|---|
| 0.3967 | 1 | 0.1397 | 0.140 | 0.1500 |
| 0.5263 | 2 | 0.3026 | 0.163 | 0.3000 |
| 0.6811 | 3 | 0.4681 | 0.165 | 0.4500 |
| 0.2101 | 4 | 0.5710 | 0.103 | 0.6000 |
| 0.3678 | 5 | 0.7368 | 0.166 | 0.7500 |
| 0.1550 | 6 | 0.8655 | 0.129 | 0.9000 |
| 0.8219 | 7 | 1.0822 | 0.217 | 1.0500 |
| 0.5635 | 8 | 1.2063 | 0.124 | 1.3500 |
| 0.0??? | 9 | 1.3076 | 0.101 | 1.5000 |
|  |  | 1.5214 | 0.214 |  |
|  |  | ?044 | 0.15? |  |
| 0.2473 | 17 |  |  | 2.5500 |
| 0.1693 | 18 | 2.6?? |  | 2.7000 |
| 0.9220 | 19 | 2.8922 | 0.225 | 2.8500 |
| 0.5808 | 20 | 3.0081 | 0.116 | 3.0000 |
| 0.6921 | 21 | 3.1692 | 0.161 | 3.1500 |
|  |  | 3.2683 | 0.099 | 3.?000 |
|  |  | ?4096 | 0.141 |  |
| 0.0754 | 44 |  |  | 6.6000 |
| 0.6396 | 45 | 6.7?? |  | 6.7500 |
| 0.9906 | 46 | 6.9491 | 0.185 | 6.9000 |
| 0.1864 | 47 | 7.0186 | 0.070 | 7.0500 |
| 0.3212 | 48 | 7.1821 | 0.163 | 7.2000 |
| 0.1667 | 49 | 7.3167 | 0.135 | 7.3500 |
| 0.8512 | 50 | 7.5351 | 0.218 | 7.5000 |
| 0.497 |  | aveg = max = min = | 0.151 0.225 0.070 |  |

SPREAD ILLUMINATING APPARATUS WITH IRREGULAR INTERVAL OF GROOVES OF LIGHT REFLECTION PATTERN

BACKGROUND OF THE INVENTION

1. Field of the Invention

The present invention relates to a spread illuminating apparatus, and particularly to a spread illuminating apparatus used as an illuminating means for a liquid crystal display.

2. Description of the Related Art

A liquid crystal display characterized by its low profile, small occupied volume, light weight, etc. has been extensively used in electronic products including portable telephones and notebook computers and the demand thereof has been increased. However, since a liquid crystal of the liquid crystal display does not emit light by itself, a separate illuminating means is needed besides the liquid crystal display when used in dark places where solar or room light is not satisfactorily available. Thus, this illuminating means is required to be compact in size and small in power consumption. In recent years, a thin plate-like spread illuminating apparatus of side light type has often been applied.

Figure 6:
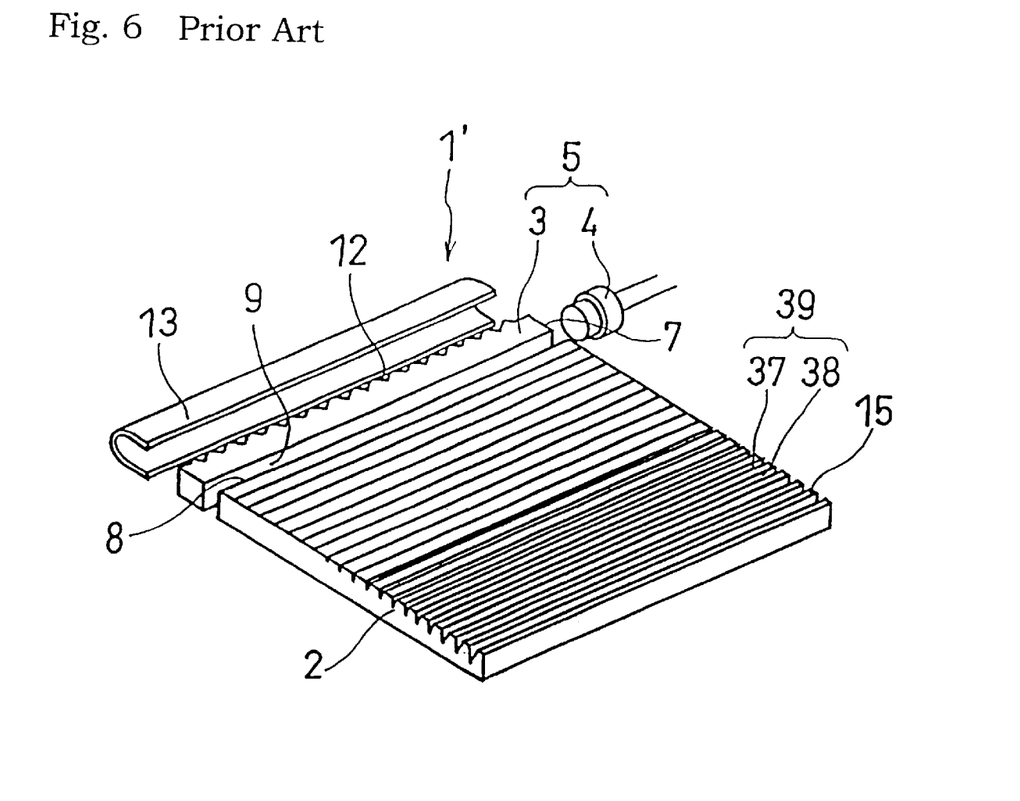
FIG. 6 is a perspective view showing an embodiment of a conventional spread illuminating apparatus.

FIG. 6 shows an embodiment of a conventional spread illuminating apparatus of side light type.

As shown in the figure, a spread illuminating apparatus 1' is generally composed of a transparent substrate 2 made of a light-transmissible material and a bar-like light source 5 disposed close to an end surface 8 of the transparent substrate 2. Light rays emitted from the light source 5 are introduced into the transparent substrate 2 to illuminate a liquid crystal display (not shown in the figure) disposed under the transparent substrate 2.

The light source 5 is composed of a bar-like light conductive member 3 made of a transparent material and a spot-like light source (for example, a light-emitting diode) 4 disposed facing one end 7 of the light conductive member 3. The light conductive member 3 is provided with an optical path conversion means 12. The optical path conversion means 12 includes grooves, for example, triangular in cross section, located on a surface opposite to a surface (one side surface) 9 of the bar-like light conductive member 3 facing the end surface 8 of the transparent substrate 2, and thereby functions to allow light rays emitted from the spot-like light source 4 to be made incident on the end surface 8 of the transparent substrate 2 in a substantially uniform manner. The light conductive member 3 is disposed with the surface 9 running along the end surface 8 of the transparent substrate 2 at a predetermined distance therefrom.

A light reflection member (frame) 13 is provided around the light conductive member 3 so as to efficiently guide the light rays emitted from the spot-like light source 4 into the transparent substrate 2. The light reflection member 13 is substantially U-shaped and covers longitudinal surfaces of the light conductive member except the surface 9 facing the transparent substrate 2.

A light reflection pattern 39 is formed on an upper surface 15 of the transparent substrate 2. The light reflection pattern 39 comprises grooves 37 triangular in section and flat portions 38 adjacent thereto, both formed parallel to the light conductive member 3 with predetermined intervals between each other. The depth of the grooves 37 increases gradually in proportion to the increase in distance from the light conductive member 3 so that light coming from the light conductive member 3 and entering the transparent substrate 2 is reflected at a whole surface of the transparent substrate 2 in a substantially uniform manner irrespective of the distance from the light conductive member 3 (the light source 5) thereby uniformly illuminating a liquid crystal display (not shown in the figure) provided under the transparent substrate 2.

In addition, the light reflection pattern 39 may consist of prisms forming a stair-like configuration.

However, in a front light system in which a spread illuminating apparatus using such a light reflection pattern 39 is placed on a front face of a reflection-type liquid crystal display element, interference fringes (moiré pattern) created by fringes formed due to the difference in transmissivity (difference in a transmitting direction due to refraction) between the grooves 37 and the flat portions 38 and the array of mosaic pattern (cell boundary) of liquid crystal cells constituting pixels of the liquid crystal display (liquid crystal display element) are noticeable when light rays reflected at the reflection-type liquid crystal element pass through the light reflection pattern 39, which causes difficulty in observing an image. The appearance of the moiré pattern is closely related to the pattern shape of the light reflection pattern 39, i.e., the depth, size and interval of the grooves 37. Since the moiré pattern is a phenomenon unique to the front light system, there is a disadvantage that it appears at different positions and intervals according to a change of an observer's visual angle and that there is an appearance of light-and-dark fringes which are different in type from moiré fringes.

In view of the foregoing matters, the inventors of the present invention disclosed an invention in the Japanese Patent Application Laid-Open No. Hei 11-260128 as a countermeasure for the moiré fringes, featuring that a predetermined relation is satisfied between the interval of the grooves of the light reflection pattern formed on the transparent substrate and the interval of the pattern arrayed parallel to the grooves on the transparent substrate out of the mosaic patterns arrayed of the liquid crystal cells of the reflection-type liquid crystal display element.

Furthermore, the Japanese Patent Application Laid-Open No. Hei 11-339526 discloses an invention in which, a light diffusion plate is disposed over the reflection-type liquid crystal display element to diffuse light rays emitted from the transparent substrate, thus preventing the light-and-dark fringes from appearing on the upper surface of the transparent substrate, whereby the appearance of the interference fringes (moiré pattern) due to light-and-dark fringes and the array of the liquid crystal cells of the reflection-type liquid crystal display element is suppressed.

Figure 7:
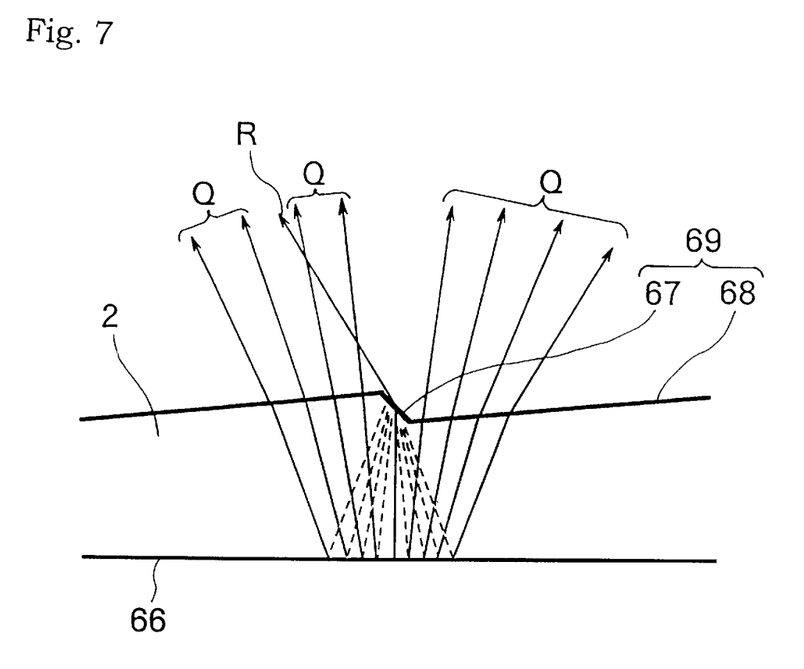
FIG. 7 shows a refractive direction of light as a factor of an appearance of light-and-dark fringes.

Moreover, the monthly publication "DISPLAY" (April 2000 Issue) discloses a method for optimizing the elimination of moiré fringes by providing a predetermined angle θ (θ=22.5°) of inclination to a prism ridge and an electrode array. FIG. 7 shows a spread illuminating apparatus 1" based on this art.

As shown in the figure, a light reflection pattern 69 formed on the upper face of the transparent substrate 2 is composed of grooves 67 and flat portions 68 adjacent thereto. The grooves 67 and the flat portions 68 are formed with a predetermined angle θ of inclination (preferably, θ=22.5°) with respect to the optical axis of the bar-like light source 5.

The spread illuminating apparatus disclosed in the aforementioned Japanese Patent Application Laid-Open No. Hei 11-339526 has been effective as a remedy for moiré pattern but has the following disadvantages.

In the spread illuminating apparatus disclosed in the Japanese Patent Application Laid-Open No. Hei 11-339526, additional parts such as a light diffusion plate for diffusing light must be provided to prevent the light-and-dark fringes from appearing on the upper surface of the transparent substrate, whereby the cost is inevitably increased. Since light is absorbed and diffused when the light passes through the light diffusion plate, the visibility and contrasts are lowered.

Moreover, there has been no effective remedy for the appearance of the light-and-dark fringes positions, the intervals of which vary according to the change of an observer's visual angle, as causes of their appearance have been unknown.

In the spread illuminating apparatus 1'' shown in FIG. 7, since the grooves 67 are formed with the angle θ of inclination as shown in the figure, an increased amount of light reflected at the grooves is made incident in an inclined manner on the liquid crystal display element side in comparison with a spread illuminating apparatus in which grooves are formed parallel to the optical axis of a light source without an inclination angle, whereby the efficiency of light utilization becomes poor, lowering the brightness.

SUMMARY OF THE INVENTION

The present invention has been made in the light of the above problems and the object of the present invention is to provide a spread illuminating apparatus capable of suppressing the appearance of moiré fringes and even light-and-dark fringes, different in type from moiré fringes, at a low cost without providing additional pads, all while maintaining the efficiency of light utilization.

In order to solve the above problems, according to a first aspect of the present invention, in a spread illuminating apparatus of side light type, comprising a transparent substrate made of a light-transmissible material and a longitudinal light source disposed close to a side surface of the transparent substrate, and in which a light reflection pattern consisting of a plurality of grooves and a plurality of flat portions adjacent to the grooves or a light reflection pattern consisting of prisms forming a stair-like configuration, is formed on the transparent substrate, the interval of the grooves of the light reflection pattern is set to be irregular.

Moreover, according to a second aspect of the present invention, in the first aspect, the light reflection pattern is so formed as to be parallel to the optical axis of the light source or to have a fixed angle.

Furthermore, according to a third aspect of the present invention, in the first or second aspect, an $i^{th}$ groove or step from the light source side of the light reflection pattern is formed to be positioned to satisfy the formula $$Pi = i \times C + \{B \times (-A + Q/10)\}, (i=1, 2, 3 \ldots)$$

where Q is a random number, Pi is a distance from the light source side of the light reflection pattern to a place where the $i^{th}$ groove is positioned, C is an average interval between adjacent grooves, B is a variation adjusting value, and A is a deviation adjusting value.

Still further, according to a fourth aspect of the present invention, in any one of the first to third aspects, the variation ratio of each interval of the grooves of the light reflection pattern set to be irregular is calculated by the formula:

$$[PH = \{(Pmax - Ptrg)/Ptrg\} \times 100],$$

or $$[PH = \{(Ptrg - Pmin)/Ptrg\} \times 100],$$

where PH is the variation ratio, Pmax is the maximum interval value, Pmin is the minimum interval value, and Ptrg (≈C) is the average interval value; and this variation ratio is set to range from 25% to 85%.

Still further, according to a fifth aspect of the present invention, in any one of the first to fourth aspects, each groove is formed to meander.

DESCRIPTION OF THE PREFERRED EMBODIMENTS

Preferred embodiments of the present invention are hereinafter explained referring to the attached drawings. The spread illuminating apparatus according to the present invention is improved with respect to the interval of the grooves of a light reflection pattern formed on a transparent substrate of the spread illuminating apparatus explained in a prior art, and the components identical with or corresponding to those of the conventional spread illuminating apparatus are represented by the same reference numerals and the detailed descriptions thereof are omitted.

Although the following embodiment includes an explanation of a spread illuminating apparatus mounted on an upper part of a liquid crystal display (front light), the spread illuminating apparatus may be disposed on a lower part of the liquid crystal display (back light). In the latter case, the apparatus is effective only at suppressing the appearance of the moiré pattern.

Figure 1:
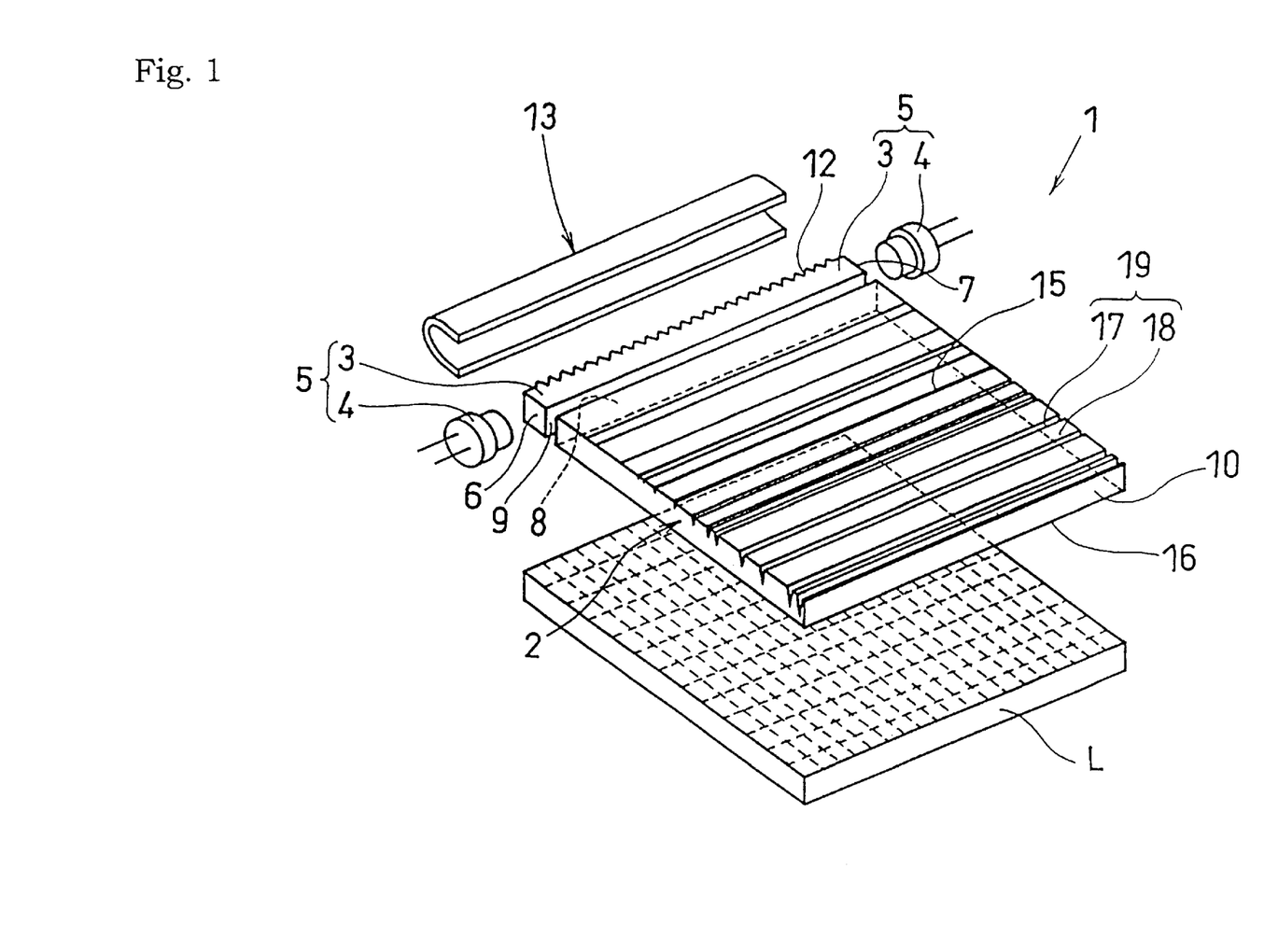
FIG. 1 is an exploded perspective view showing an embodiment of a spread illuminating apparatus according to the present invention.

FIG. 1 is an exploded perspective view showing an embodiment of the spread illuminating apparatus in accordance with the present invention. As shown in the figure, a spread illuminating apparatus 1 is generally composed of a transparent substrate 2, a light source 5 disposed along and close to one end surface 8 of the transparent substrate 2, and a light reflection member (also referred to as a "frame") 13. A light reflection pattern 19 is formed on an upper surface (a surface of observation side) 15 of the transparent substrate 2, and light coming from the light source 5 and made incident on the end surface 8 of the transparent substrate 2 is uniformly emitted by means of the light reflection pattern 19 to a liquid crystal display L disposed on a lower surface 16 of the transparent substrate 2.

The light source 5 is composed of a bar-like light conductive member 3 made of a transparent material and spot-like light sources 4 disposed facing end faces 6 and 7 of the light conductive member 3. An optical path conversion means 12 is formed on one surface of the light conductive member 3. The light reflection member 13 is substantially U-shaped and is disposed so as to cover the light conductive member 3 when the spread illuminating apparatus 1 is assembled (refer to FIG. 2).

The light reflection pattern 19 is composed of grooves 17 substantially triangular in section and flat portions 18 adjacent to the grooves and is formed to be parallel to the optical axis of the light source 5 (also referred to as the optical axis of the light conductive member 3) or to have the prescribed angle. The interval in the light reflection pattern 19, i.e., the interval between adjacent grooves 17 (also referred to as "groove interval") is set to be irregular (vary). Since setting the interval of the grooves 17 to be irregular makes indefinite the relation between the interval of the grooves 17 and the interval of the mosaic pattern of liquid crystal cells, the appearance of moiré pattern can be suppressed. The depth of the grooves 17 is small toward the end surface 8 (toward the light source 5) of the transparent substrate 2 and large toward another end surface 10. In other words, the depth of the grooves 17 increases gradually in proportion to the increase in distance from the light source 5.

Figure 2:
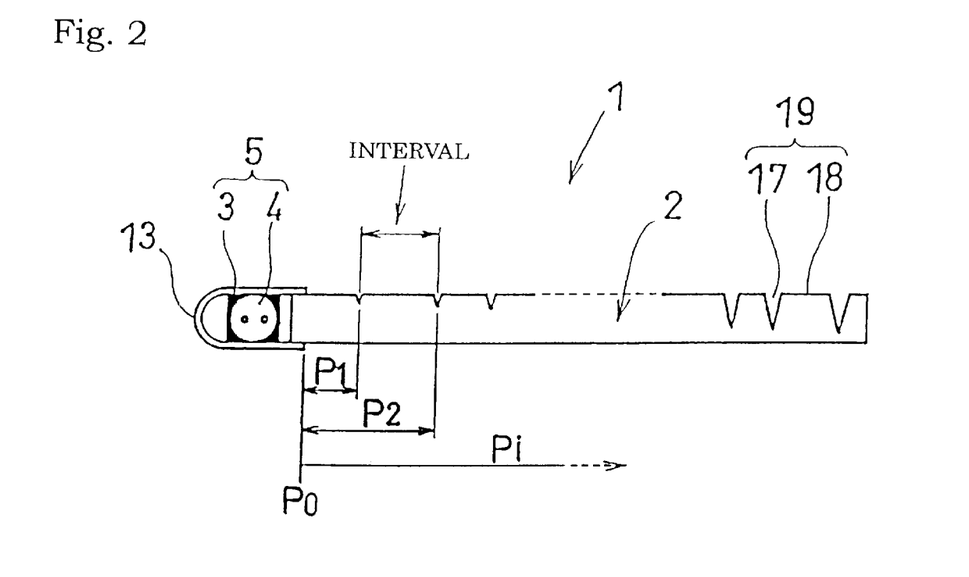
FIG. 2 is a schematic side-view showing a light reflection pattern formed on a transparent substrate of a spread illuminating apparatus according to the present invention.
Figure 3:
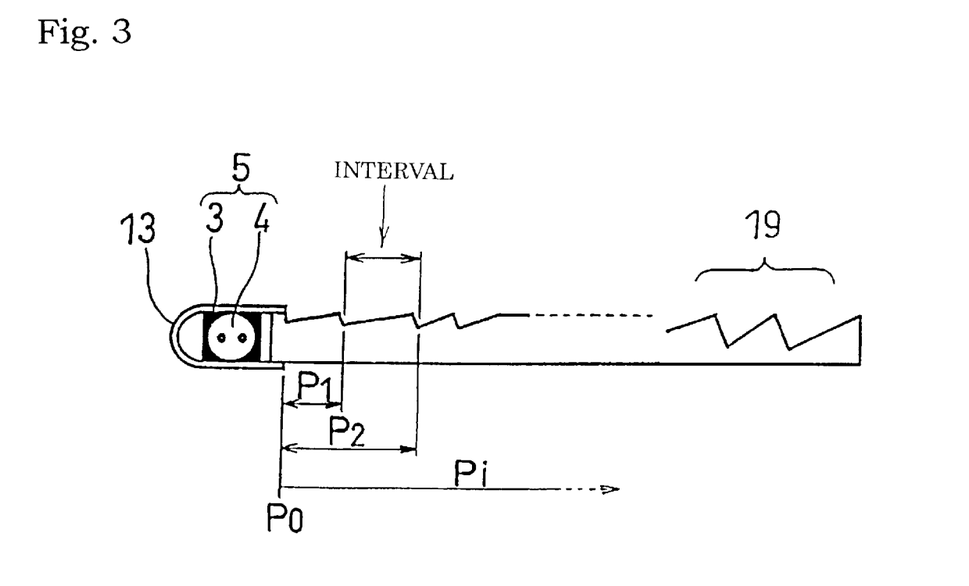
FIG. 3 is a schematic side-view showing a light reflection pattern formed on a transparent substrate of a spread illuminating apparatus according to the present invention.

The above embodiment discloses the light reflection pattern 19 comprising the grooves 17 and the flat portions 18; however, the present invention is not limited to such embodiment but the light reflection pattern may comprise prisms defining stair-like configuration or may comprise grooves substantially trapezoidal in section or having a plurality of steps therein. The light reflection pattern may also include grooves meandering in section. FIG. 2 is a side view of a spread illuminating apparatus having the light reflection pattern 19 comprising the grooves 17 and the flat portions 18, and FIG. 3 is a side view of a spread illuminating apparatus having the light reflection patterns 19 comprising prisms defining stair-like configuration. In the light reflection pattern 69 comprising prisms as shown in FIG. 3, the interval (each interval of the light reflection pattern 69) of inclined surfaces (steps) 67 of the prisms is set to be irregular. In addition, the step height of the steps 67 of the prisms increases gradually in proportion to the increase in distance from the light source 5.

The above embodiment discloses the spread illuminating apparatus in which one spot-like light source 4 is disposed on each of the end faces 6 and 7 of the light conductive member 3; however, the present invention is not limited to such embodiment, and it is possible that one spot-like source 4 is disposed on either the end face 6 or the end face 7. In addition, a fluorescent lamp, which is a bar-like light source, may be used in place of the light source 5 comprising the light conductive member 3 and the spot-like light source 4. Moreover, one light source 5 is disposed only on the end surface 8 of the transparent substrate 2 in the above embodiment; however, the present invention is not limited to such arrangement, and one light source 5 may be disposed on each of end surfaces of the transparent substrate 2, i.e., the end surface 8 and the end surface 10.

Each interval of the light reflection patterns 19 and 69, i.e., an interval between adjacent grooves 17 or an interval between adjacent steps 67 is formed irregular so that even the appearance of the light-and-dark fringes different in type from moiré fringes, positions and intervals of which vary according to the change of an observer's visual angle, can be suppressed.

The appearance of these light-and-dark fringes is caused by the configuration of the light reflection pattern and an unnecessary reflected light under the transparent substrate and is considered to be created through the following mechanism.

Figure 8:
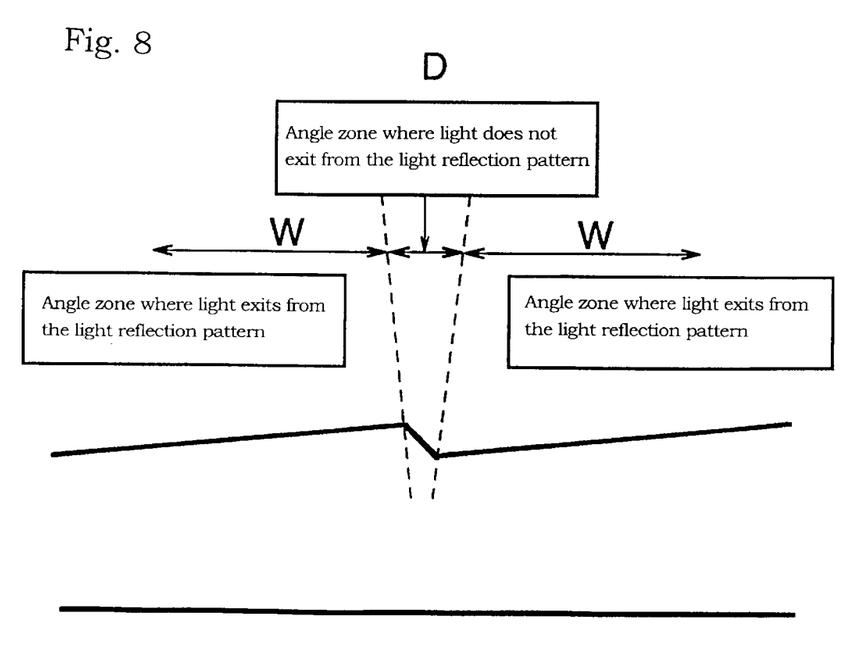
FIG. 8 shows an exit zone of light as a factor of an appearance of light-and-dark fringes.

The mechanism is explained by example of the light reflection pattern 69 consisting of prisms forming stair-like configuration with reference to FIGS. 7 and 8. As shown in FIG. 7, when light Q and light R reflected at a lower surface 66 of the transparent substrate 2 exit outside of the light reflection pattern 69, refractive directions (directions of arrows Q and R) are greatly different between the light R exiting outside after being refracted at the prism step 67 and the light Q exiting after being refracted at a gently inclined surface 68 of the prism. Thus, as shown in FIG. 8, there generates an angle zone D from which light does not exit outside of the light reflection pattern 69. When directions of which the light does not exit are the same within a certain area, and an observer's visual point is in a zone where the light does not exit, the zone is recognized as a dark portion by the observer. Although not shown in the figure, there generates a plurality of other angle zones from which light does not exit due to a geometric relation between adjacent steps or a geometric relation between other steps than adjacent ones. Thus, a plurality of dark portions generate in the conventional structure in which adjacent steps 67 have a prescribed interval.

Therefore, the directions of which the light does not exit cannot be the same between adjacent steps, and dark portions, except one dark line which generates in a perpendicular direction with respect to the transparent substrate, cannot be recognized by the observer.

The irregular interval of the grooves of the light reflection pattern formed on the transparent substrate is explained hereinafter with reference to FIGS. 2 and 4.

FIG. 2 is a side view of the spread illuminating apparatus 1 having the light reflection pattern 19 comprising the grooves 17 and the flat portions 18. The grooves 17 are located at respective positions having distances of P1, P2, . . . Pi from a predetermined point to be a starting point of the light reflection pattern (starting point) P0 positioned close to the light source 5 on the transparent substrate 2. The intervals of the grooves 17 (groove intervals) are obtained by P1-P0, P2-P1, . . . Pi-Pi−1 to be set to be irregular. The depth of the grooves 17 increases in proportion to the increase in distance from the light source 5.

Although details are omitted, as shown in FIG. 3, in a spread illuminating apparatus in which a light reflection pattern consists of prisms forming a stair-like configuration, portions corresponding to the grooves described above (FIG. 2) are to be the inclined surfaces (steps) 67 of the prisms.

Figure 4:
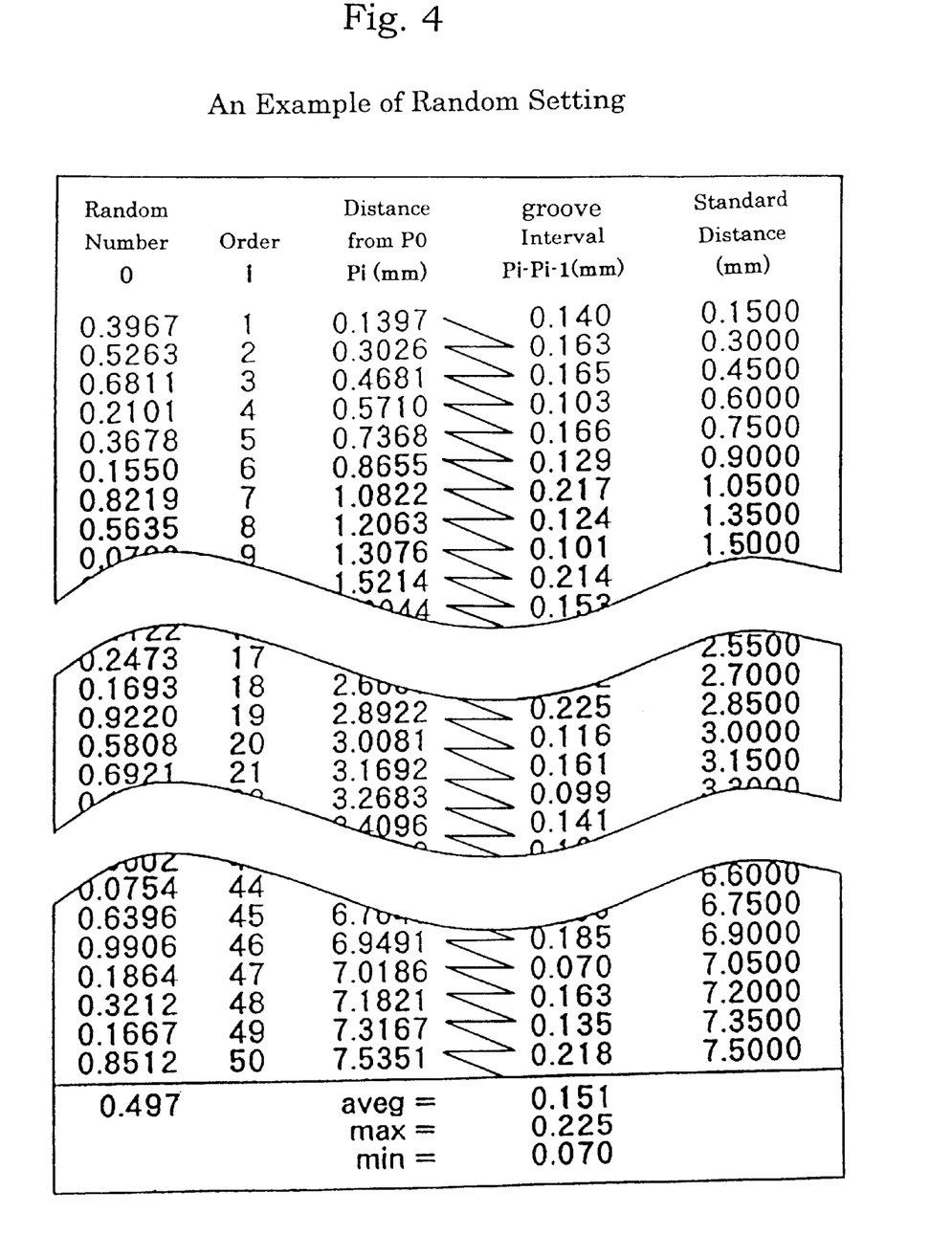
FIG. 4 shows an example of setting a groove interval of the light reflection pattern of the spread illuminating apparatus according to the present invention.

FIG. 4 shows the set value, etc. (example of random setting) of grooves formed at irregular intervals on the transparent substrate. The numeral in the figure indicates the order of the groove counted from the starting point P0, and Pi indicates a distance from the starting point P0 to an $i^{th}$ groove. Pi-Pi−1 indicates an interval between adjacent grooves (groove interval), and Q is a random number to set the groove interval to be irregular. The standard distance refers to the position of the $i^{th}$ groove formed when the interval of the grooves is set to be regular (0.15 mm). The distance Pi from the starting point P0 to the $i^{th}$ groove is obtained from the following formula:

$$Pi = i \times C + \{B \times (-A + Q/10)\} [mm]$$

where, i=1, 2, 3 . . .

C: average groove interval (set to be 0.15 mm in this embodiment)

B: Variation adjusting value

A: Deviation adjusting value

The variation ratio PH of the groove interval to vary irregularly is obtained from the formula:

$$[PH=\{(Pmax-Ptrg)/Ptrg\}\times 100]$$

or $$[PH=\{(Ptrg-Pmin)/Ptrg\}\times 100],$$

where Pmax is the maximum interval value, Pmin is the minimum interval value, and Ptrg ($\approx$C) is the average interval value.

This variation ratio PH (the maximum variation) must be set to range from 25% to less than 85% and is set to be about 50% in the example of the random setting shown in FIG. 4. When the variation ratio PH (the maximum variation) is set to be under 25%, the effect by countermeasures to the moiré fringes and the light-and-dark fringes is lessened. On the contrary, when the PH (the maximum variation) is set to be at least 85%, there easily occurs a problem of interference with adjacent grooves. Although the limit value of the interference in the groove interval varies depending on the size of a liquid crystal display screen and the set value of the average groove interval, it is essential to ensure the groove interval is at least twice as large as the groove width in view of the relation with the groove width (the groove depth).

In the above-mentioned embodiments, the random numbers shown in FIG. 4 are used as a means for setting the groove interval to be irregular; however, the present invention is not limited to this, and the groove interval can be set to be irregular also with a non-circulating number such as $\pi$=3.141527 . . . , and a similar effect can be obtained.

Figure 5:
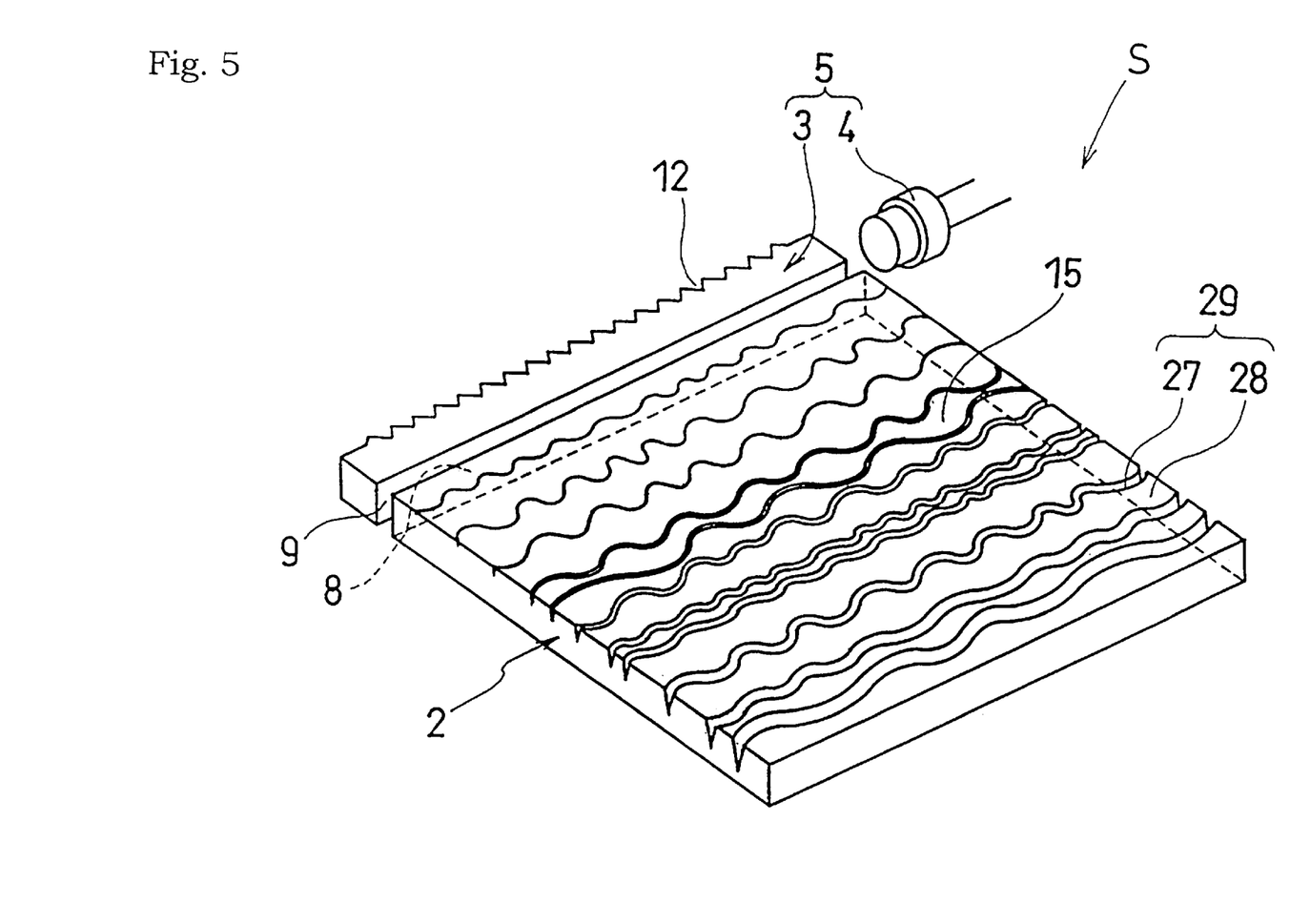
FIG. 5 is a perspective view showing another embodiment of a spread illuminating apparatus according to the present invention.

FIG. 5 is a perspective view showing another embodiment of a spread illuminating apparatus according to the present invention.

In a spread illuminating apparatus S in the figure, grooves 27 constituting a light reflection pattern 29 to be formed on the transparent substrate 2 are formed to meander (wind toward adjacent grooves) when viewed from an upper surface 16 side. The appearance of the moiré pattern and light-and-dark fringes can be further suppressed by making the grooves 27 meander in addition to varying irregularly the groove interval as in the above embodiment. The period of the winding may be varied from groove to groove or within one groove. The dimension of the winding is set so as not to interfere with adjacent grooves. In addition, the depth of the grooves 27 increases gradually in proportion to the increase in distance from the light source 5. In FIG. 5, the transparent substrate 2 (including the grooves 27) is shown in an enlarged manner, and a light reflection member, a liquid crystal display, etc. are omitted.

In the spread illuminating apparatus according to the present invention, each interval of the grooves of the light reflection pattern formed on the transparent substrate is varied irregularly, whereby the interval of the fringes created by the light reflection pattern is adapted no to be definite with respect to the interval of the mosaic pattern of the liquid crystal cells, so the appearance of the moiré pattern between the both can be suppressed. Even when the moiré pattern appears, it is not continuous and not visually recognized by an observer so that the deterioration in the image quality caused by the moiré pattern can be prevented.

In the spread illuminating apparatus according to the present invention, each interval of the grooves of the light reflection pattern formed on the transparent substrate is varied irregularly, so that the appearance of the light-and-dark fringes parallel to the light reflection pattern, which move on an observation screen and intervals of which are changed according to a change of an observer's visual angle, can be suppressed.

The appearance of the moiré pattern and light-and-dark fringes can be surely suppressed by setting the variation ratio of the light reflection pattern to a predetermined range (from at least 25% to less than 85% of the average groove interval).

This method of suppressing the appearance of the moiré pattern is effective in suppressing the moiré pattern which noticeably appears when each interval of the grooves of the light reflection pattern is regular and is approximate to the interval of the mosaic pattern of the liquid crystal cells. Furthermore, since each interval of the grooves of the light reflection pattern is varied irregularly also in a system in which the interval of the grooves of the light reflection pattern is varied gradually with the increase in distance from the light source in order to make light reflected at the light reflection pattern uniform over the whole screen, the appearance of a localized moiré pattern seen at the position where the interval of the fringes created by the light reflection pattern and the interval of the mosaic pattern of the liquid crystal cells are put in a certain relation can be suppressed.

Moreover, by winding the grooves of the light reflection pattern formed on the transparent substrate, the relationship between the interval of the fringes created by the light reflection pattern and the interval of the mosaic pattern of the liquid crystal cells can be made irregular even in one groove of the light reflection pattern, and the appearance of the moiré pattern and light-and-dark fringes can be further suppressed.

Furthermore, since the appearance of the moiré pattern and light-and-dark reflection fringes can be suppressed by varying each interval of the light reflection pattern formed on the transparent substrate irregularly or by winding the grooves of the light reflection pattern, there is no necessity of additional components, which prevents the cost from increasing.

Since the light reflection pattern is formed substantially parallel to the optical axis of the light source, a reduced amount of light reflected at the grooves of the light reflection pattern is made incident in an inclined manner on the liquid crystal display element side compared to a case where the appearance of the moiré pattern is suppressed by inclining the light reflection pattern, whereby the appearance of the moiré pattern can be suppressed without deteriorating the light utilization efficiency.

Still further, since the appearance of the moiré pattern can be suppressed by varying irregularly the interval of the grooves of the light reflection pattern formed on the transparent substrate or by winding the grooves of the light reflection pattern, no additional component is required, which prevents an extra cost.

What is claimed is:

1. A spread illuminating apparatus of side light type, comprising:

a transparent substrate made of a light-transmissible material;

a bar-like light source disposed along and close to an end surface of the transparent substrate; and a light reflection pattern formed on the transparent substrate, and consisting of a plurality of grooves and a plurality of flat portions adjacent thereto, wherein intervals of the grooves of the light reflection pattern are varied irregularly.

2. A spread illuminating apparatus of side light type, comprising:
- a transparent substrate made of a light-transmissible material;
- a bar-like light source disposed along and close to an end surface of the transparent substrate; and
- a light reflection pattern formed on the transparent substrate, and consisting of a plurality of prisms forming a stair-like configuration,
- wherein intervals of the prism steps of the light reflection pattern are varied irregularly.

3. The spread illuminating apparatus according to claim 1, wherein the light reflection pattern is formed so as to be parallel to the bar-like light source.

4. The spread illuminating apparatus according to claim 1, wherein the light reflection pattern is formed so as to have a predetermined angle to the bar-like light source.

5. The spread illuminating apparatus according to claim 1, wherein an $i^{th}$ groove from the light source side is positioned so as to satisfy a formula:

$$Pi = i \times C + \{B \times (-A + Q/10)\}, (i=1, 2, 3 \ldots),$$

where Q is a random number, Pi is a distance from a predetermined point to a place where the $i^{th}$ groove is positioned, C is an average interval between adjacent grooves, B is a variation adjusting value, and A is a deviation adjusting value.

6. The spread illuminating apparatus according to claim 1, wherein a variation ratio of each interval of the grooves set to be irregular is calculated by a formula:

$$[PH = \{(Pmax - Ptrg)/Ptrg\} \times 100],$$

or $$[PH = \{(Ptrg - Pmin)/Ptrg\} \times 100],$$

where PH is a variation ratio, Pmax is a maximum interval value, Pmin is a minimum interval value, and Ptrg (=C) is an average interval value, and the variation ratio PH is set to range from 25% to 85%.

7. The spread illuminating apparatus according to claim 1, wherein the grooves of the light reflection pattern are formed to meander.

8. The spread illuminating apparatus according to claim 2, wherein the light reflection pattern is formed so as to be parallel to the bar-like light source.

9. The spread illuminating apparatus according to claim 2, wherein the light reflection pattern is formed so as to have a predetermined angle to the bar-like light source.

10. The spread illuminating apparatus according to claim 2, wherein an $i^{th}$ prism step from the light source side is positioned so as to satisfy a formula:

$$Pi = i \times C + \{B \times (-A + Q/10)\}, (i=1, 2, 3 \ldots),$$

where Q is a random number, Pi is a distance from a predetermined point to a place where the $i^{th}$ prism step is positioned, C is an average interval between adjacent prism steps, B is a variation adjusting value, and A is a deviation adjusting value.

11. The spread illuminating apparatus according to claim 2, wherein a variation ratio of each interval of the prism steps set to be irregular is calculated by a formula:

$$[PH = \{(Pmax - Ptrg)/Ptrg\} \times 100],$$

or $$[PH = \{(Ptrg - Pmin)/Ptrg\} \times 100],$$

where PH is a variation ratio, Pmax is a maximum interval value, Pmin is a minimum interval value, and Ptrg (≈C) is an average interval value, and the variation ratio PH is set to range from 25% to 85%.

12. The spread illuminating apparatus according to claim 2, wherein the prism steps of the light reflection pattern are formed to meander.

* * * * *